U.S. Patent [19] 4,261,053
Dostis et al. [45] Apr. 7, 1981

[54] PSK MODULATOR WITH REDUCED ADJACENT CHANNEL INTERFERENCE

[75] Inventors: Irving Dostis, McLean; Myung-Ki Lee, Reston, both of Va.; Osamu Shimbo, Rockville, Md.

[73] Assignee: Satellite Business Systems, McLean, Va.

[21] Appl. No.: 26,260

[22] Filed: Apr. 2, 1979

[51] Int. Cl.³ .................. H03K 25/49; H04L 27/20
[52] U.S. Cl. .................................... 375/60; 375/67
[58] Field of Search ........ 179/15 AN, 15 BA, 15 FS; 325/123, 124, 145, 163; 178/67; 332/16 R, 18, 23 R, 23 A; 375/60, 62, 67, 54

[56] References Cited

U.S. PATENT DOCUMENTS

| 2,084,740 | 6/1937 | McKesson | 325/124 |
|---|---|---|---|
| 2,719,189 | 9/1955 | Bennett et al. | 179/15 AN |
| 3,177,431 | 4/1965 | Ashley | 325/123 |
| 3,597,688 | 8/1971 | Ogi | 178/67 |
| 3,890,581 | 6/1975 | Stuart et al. | 325/163 |

*Primary Examiner*—Benedict V. Safourek
*Attorney, Agent, or Firm*—Pollock, Vande Sande & Priddy

[57] ABSTRACT

A PSK modulator employs a waveform of the overlapped raised cosine type which results in reduced adjacent channel interference. Waveforms of the overlapped raised cosine type include the overlapped raised cosine waveform itself as well as waveforms substantially similar thereto. Such waveforms can be produced, in a PSK modulator, by employing a Thomson filter with a single attenuation pole. Employing such a filter with a time bandwidth product (BT) of 1.2 provides the overlapped raised cosine waveform. However, changing the Thomson filter's BT product to 1.0 to thereby generate a waveform of the overlapped raised cosine type provides even further improvements in adjacent channel interference.

23 Claims, 16 Drawing Figures

T = SYMBOL PERIOD

CONSTANT CURRENT MODEL (THOMSON, BT=1.01)(ONE ATTENUATION POLE)

FIG 15B 3 dB ATTENUATION POINT = $f_0$ = 12 MHz
ATTENUATION POLE AT 2.8 $f_0$ = 33.6 MHz

4TH ORDER THOMSON LOWPASS FILTER (BT=1.0, ONE ATTENUATION POLE)

PSK MODULATOR WITH REDUCED ADJACENT CHANNEL INTERFERENCE

FIELD OF THE INVENTION

The present invention relates to a PSK modulator, particularly one with improved adjacent channel interference characteristics.

BACKGROUND OF THE INVENTION

Phase Shift Keyed (PSK) modulators are known in the art, the resulting modulation of such devices generally modifies the phase of a carrier in accordance with the intelligence desired to be transmitted. A generalized discussion of modems can be found in the paper with that title by J. R. Davey, appearing in the *Proceedings of the IEEE*, Volume 60, pages 1284–1292 (November 1972). See also "Multi-Level PSK Modems for TDMA Systems" by Noguchi in the 1975 *EASCON*, and "Design of a PSK Modem for the Telsat TDMA System" by Yokoyama et al in *ICC* 1975.

One particular form of PSK is known as quartenary phase shift keying (QPSK) in which in phase and quadrature carrier components are separately modulated by different bit streams; the modulated carrier components are then combined for transmission purposes. Typically in using a QPSK modulator a digital bit stream which carries the modulating intelligence is separated into two different bit streams (sometimes called I and Q channels) wherein alternate bits in the original stream appear on separate channels, and the bit rate on each of the I and Q channels is ½ the original bit rate. Corresponding bits on the I and Q channels correspond to a symbol, and the transmitted symbol rate is again equal to ½ the original bit rate.

Figure 1:
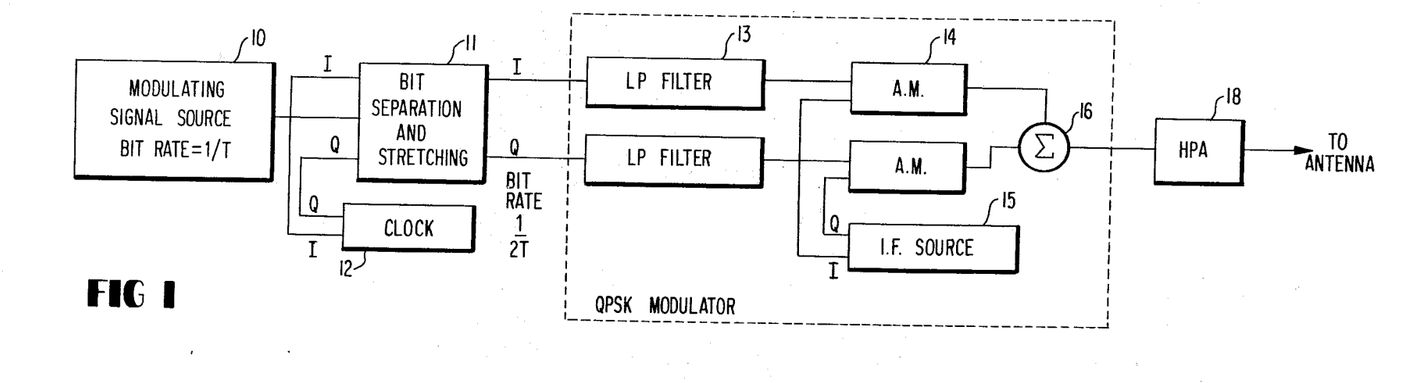
FIGS. 1 and 2 represent typical PSK modulators.

FIG. 1 illustrates a typical prior art QPSK modulator. As shown, the modulating signal source 10 (at a bit rate 1/T) provides a digital signal stream to a bit separation and stretching circuit 11 which also receives I and Q clock pulses from a clock pulse source 12. The output of the bit separation and stretching circuit 11 is an I and Q channel, each of which carry digital signal streams whose bit rate is ½ the original bit rate of the modulating signal, and in which successive bits from the modulating signal source 10 appear on separate I and Q channels. The modulator itself includes a filter 13 for each of the I and Q channels. The filtered I and Q bit streams are provided to amplitude modulators 14 for each channel. The amplitude modulators 14 also receive I and Q signals from an IF source 15. The IF source 15 corresponds to the carrier and the I and Q signals from source 15 are phase displaced by 90°. The output of the amplitude modulators are then summed in a summing device 16, and the resulting summed signal is provided to a high powered amplifier the output of which is coupled to an antenna for transmission after appropriate frequency upconversion at an appropriate radio frequency.

Figure 2:
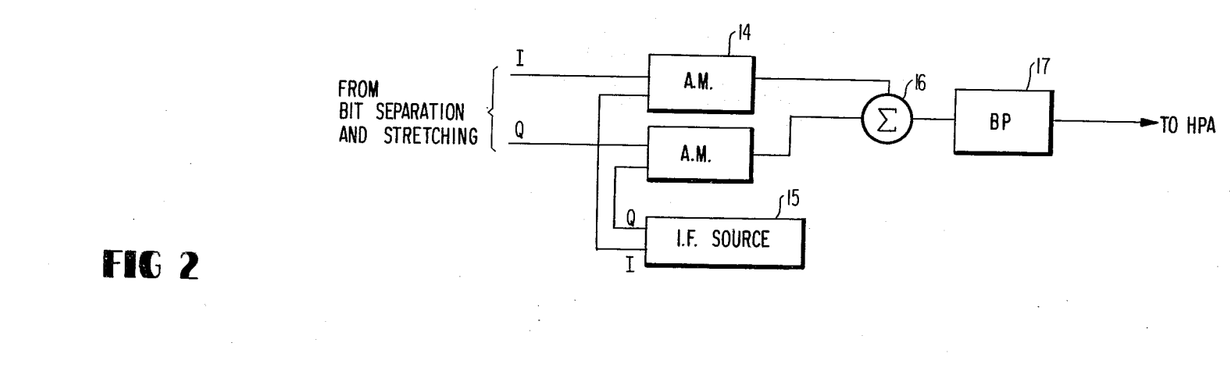

FIG. 2 illustrates an alternate version of the typical QPSK modulator. FIG. 2 in most respects is similar to FIG. 1 except that the modulator of FIG. 2 has omitted the filters 13, coupling the I and Q signals to the amplitude modulators 14 and instead provides a bandpass filter 17 coupled between the summing device 16 and the high powered amplifier (or HPA).

Efficient modulator design requires an understanding of the particular application so that the modulator characteristics can be most effectively matched with the environment in which it operates.

For example, one class of applications for modulators is in the satellite communications field, and more particularly, in systems employing Time Division Multiple Access (TDMA). In this configuration, the transmitters transmit in burst or discontinuous fashion, and accordingly, the modulators should be effective in this operating mode.

Another particular characteristic of transmitters which can be tailored by tailoring the modulator is reduction in adjacent channel interference which is also of particular importance in the TDMA satellite communication systems or at least those systems with multiple, frequency separated transponders.

Figure 3:
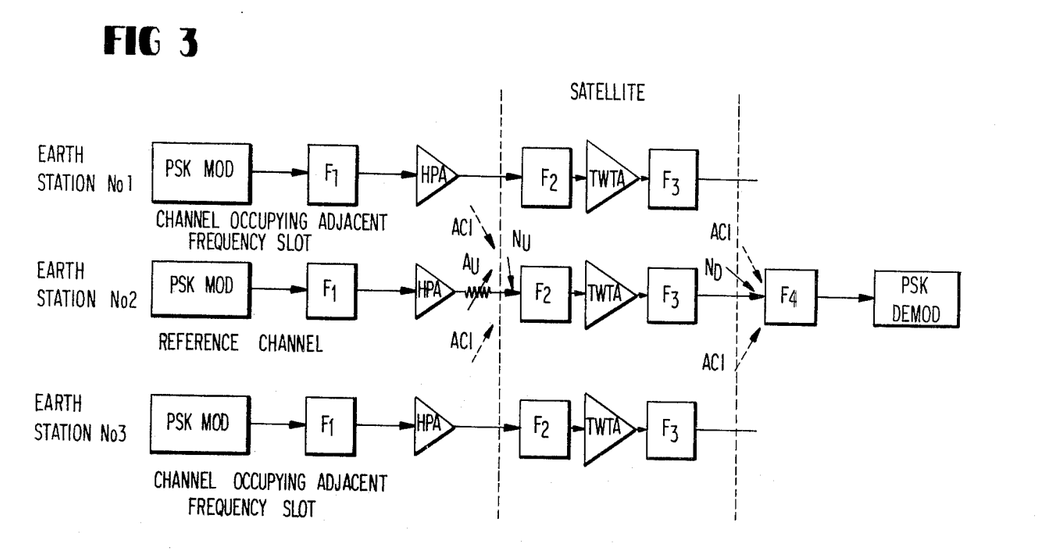
FIG. 3 is a schematic of a TDMA environment useful in representing ACI.

FIG. 3 is a block diagram of such a TDMA satellite transmission system environment. FIG. 3 illustrates three representative earth stations; of course, typical systems would employ many more than three earth stations. For each earth station, FIG. 3 illustrates a PSK modulator, a filter F1 and an HPA; of course, many other devices are in the signal chain, but these are particular devices of interest. The filtering represented by filter F1 is the filtering associated with the modulator. The satellite equipment includes an input filter F2, a travelling wavetube amplifier (TWTA) and an output filter F3. The receiving earth station includes further filtering (filter F4) and a PSK demodulator.

For analysis purposes, the transmission path of interest originates from the second earth station. That station's transmissions are affected by noise contributions from a variety of sources. Those sources include adjacent channel interference (ACI), potential up-path rain attenuation ($A_u$) and up-path thermal noise at the satellite receiver ($N_u$). The channel of interest is also affected, at the receiving earth station, by down-path thermal noise ($N_d$) as well as adjacent channel interference (ACI). At the satellite receiver, the modulated carrier, combined with noise and adjacent channel interference, is frequency translated from the up-link frequency (e.g., 14 GHz.) down to the down-link frequency (e.g., 12 GHz.) and filtered. It is then amplified by the satellite TWTA and again filtered before transmission to a receive earth station. In the down-link transmission, additional thermal noise and adjacent channel interference is contributed by the earth station system noise and by downpath interference from neighboring channels.

Earth stations numbers 1 and 3 transmit in respective TDMA bursts through channel transponders whose frequency assignments are adjacent to the channel of interest.

Figure 4:
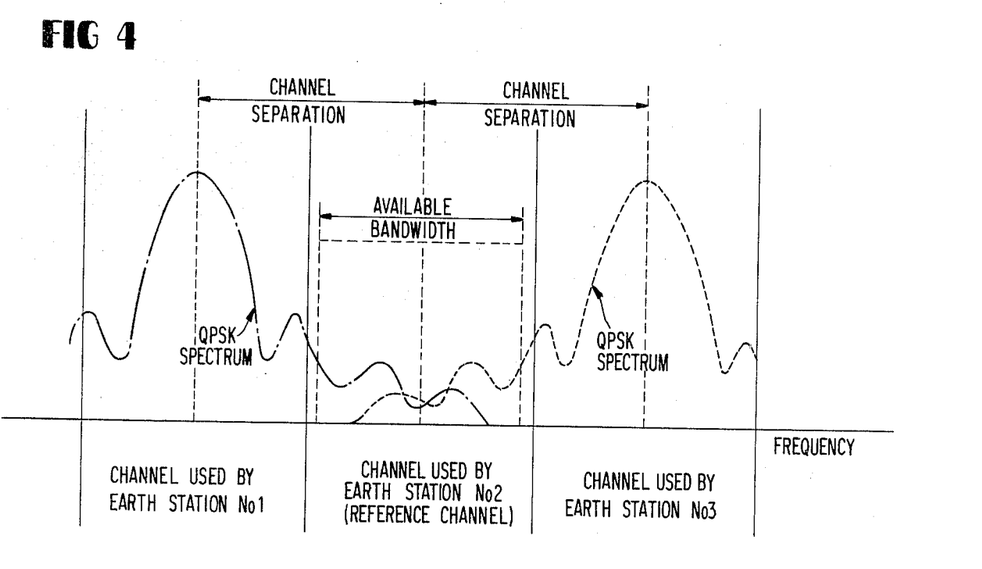
FIG. 4 is a frequency spectrum plot showing the effect of spectrum spreading of adjacent transponders.

In more detail, the digital bit stream (digitized voice or data) first modulates the carrier in the PSK modulator. Waveform shaping, which can take place at IF or baseband, is performed by the filter F1. The modulated IF is upconverted to the up-link frequency, amplified in the HPA and fed to the transmit antenna. The up-link path may be subjected to rain attenuation ($A_u$). At the satellite receiver, thermal noise ($N_u$) is introduced and ACI is contributed by out of band energy of PSK/TDMA carriers accessing transponders occupying adjacent frequency slots. This out of band energy is due to PSK spectrum spreading caused by non-linear characteristics of the HPA. FIG. 4 is an example of a QPSK spectrum after spreading takes place. The level of ACI can be decreased when the HPA operating point is moved toward a more linear region (sometimes known as HPA backoff).

At the satellite receiver, the received PSK modulated carrier combined with added thermal noise and adjacent channel interference is filtered, amplified, filtered again and transmitted to the receiving earth station.

At the earth station receiver, output thermal noise density $N_d$ is contributed. The filter F4 reduces the total level of noise and interference power before demodulation. The bit error rate, a figure of merit for the entire transmission path, is determined by the levels of thermal noise power, interference power and inter-symbol interference appearing at the demodulator input.

In order to maintain the bit error rate of the transmission channel at acceptable levels, account must be taken of power reduction on the up-link due to rain attenuation ($A_u$) on the reference channel when similar attenuation is not found in the adjacent channels from stations 1 and 3. This circumstance increases the effect of adjacent channel interference, since the signals contributing to that interference are undiminished whereas the reference signal has been reduced by the rain attenuation. Accordingly, it is exceedingly important to minimize adjacent channel interference, and this has typically been accomplished in the prior art by filtering either during the modulation process or immediately thereafter.

One well-known technique for reducing adjacent channel interference is backing off the HPA so that it operates more, or wholly, in a linear region. This, of course, reduces the output power of the reference channel and, in order to maintain constant power levels, may require provision of a larger HPA. In some systems, typically ones employing a very large number of ground stations, cost constraints require operating the HPA in its near saturation or saturation regions, and amplifier backoff is not an available option. In those situations, of course, reduction of adjacent channel interference is of even greater significance.

Control of adjacent channel interference in the prior art has been accomplished by selecting the appropriate filter 13 or 17 to control spectrum spreading. Typical filters which have been employed include Butterworth, Tschebycheff, Elliptic, or raised cosine types. While such filters do, in fact, exert control on the spectrum spreading problem, their effect is countered, in part, when the HPA is operated in near-saturation or saturation. Operation in this non-linear region increases spectrum spreading by reason of the non-linear amplifier characteristic.

It is therefore one object of the present invention to provide a PSK modulator which exemplifies reduced adjacent channel interference as compared to prior art PSK modulators. It is another object of the present invention to provide a PSK modulator which illustrates this reduction in adjacent channel interference even when an associated HPA is operated in near-saturation or saturation regions. It is a further object of the present invention to provide a PSK modulator with improved filtering action in order to control spectrum spreading and thus reduce adjacent channel interference as compared to prior art PSK modulators. It is another object of the present invention to provide improved filtering in a PSK modulator as aforesaid, which shows improved adjacent channel interference even when an associated HPA is operated in near-saturation or saturation regions.

SUMMARY OF THE INVENTION

These and other objects of the invention are met by employing filtering action in a PSK modulator which results in a waveform of the overlapped raised cosine type. For purposes of the present application, waveforms of the overlapped raised cosine type are those waveforms which mathematically fit the definition of an overlapped raised cosine or those waveforms which are substantially similar thereto. Experimental evidence indicates that waveforms of the overlapped raised cosine type exhibit reduced spectrum spreading and therefore reduced adjacent channel interference in PSK modulators. Furthermore, this improvement in adjacent channel interference performance is maintained even when modulators employing waveforms of that type are employed with associated HPAs operating in the near-saturation or saturation regions.

The improved PSK modulator of our invention can be implemented by employing an overlapped raised cosine generator to actually generate the waveform of the desired type; or by employing premodulation low-pass filtering to produce waveforms of the desired type from the modulating bit stream itself, or by employing post-modulation bandpass filtering to generate waveforms of the overlapped raised cosine type from the modulated signal stream.

One filter which we have found produces waveforms of the appropriate type is a fourth-order Thomson filter with a single attenuation pole. Such a filter with a 3 db time bandwidth (BT) product of 1.2 is capable of producing an overlapped raised cosine waveform when subjected to a squarewave input and accordingly, such filters, either of lowpass or bandpass form, can be effectively employed in PSK modulators to produce the improved adjacent channel interference performance disclosed herein. We have further found, however, that fourth-order Thomson filters with single attenuation pole having a BT product of less than 1.2 (but at least equal to 0.9) are capable of producing waveforms of the overlapped raised cosine type; the use of such filters results in adjacent channel interference performance which is as effective and perhaps more so, than the overlapped raised cosine waveform itself. We presently believe that a fourth-order Thomson filter with single attenuation pole and BT product of 1.0, while producing a waveform substantially similar to the overlapped raised cosine, produces a waveform which is sufficiently different from that waveform so that its adjacent channel interference performance, in a PSK modulator, is improved over the performance achieved by a PSK modulator with a fourth-order Thomson filter, with single attenuation pole and BT product of 1.2.

BRIEF DESCRIPTION OF THE DRAWINGS

The invention will now be explained in the following portion of the specification when taken in conjunction with the attached drawings in which like reference characters identify identical apparatus and in which:

FIG. 8 compares power spectra of conventional and overlapped raised cosine modulators at the HPA output;

DETAILED DESCRIPTION OF PREFERRED EMBODIMENTS

Figure 5:
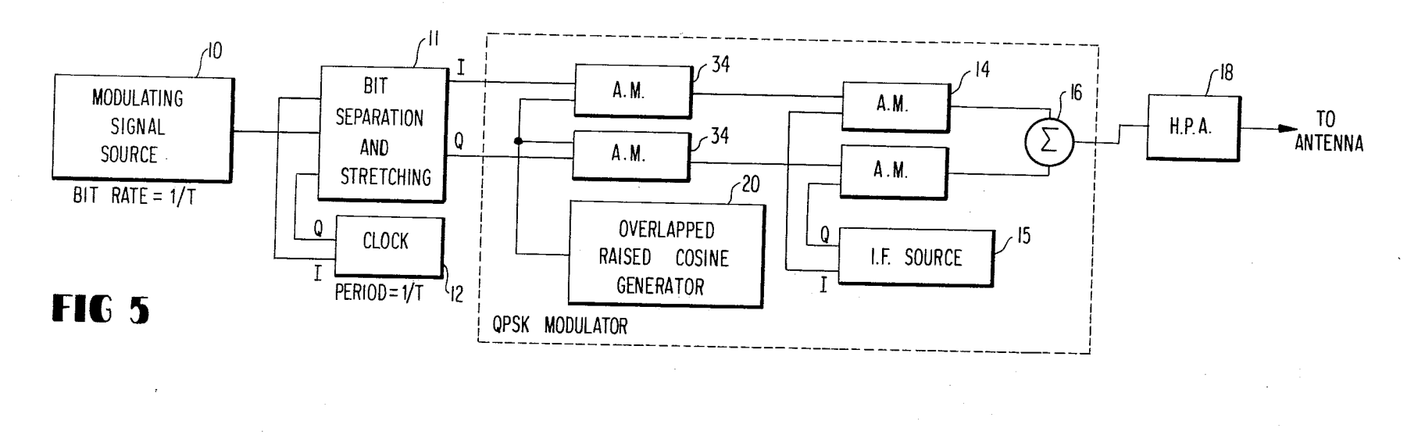
FIG. 5 is a schematic of one form of the inventive PSK modulator.

FIG. 5 is a block diagram of a QPSK modulator employing the principles of our invention, and which exhibits superior adjacent channel interference performance as compared with prior art PSK modulators which use, for spectrum spreading control, filtering achieved by Butterworth, Tschebycheff, Elliptic or raised cosine types, even when employed with an associated HPA operating in the near-saturation or saturation regions.

In the PSK modulator shown in FIG. 5, the input to the modulator is identical to the input which is produced by the apparatus shown in FIG. 1. In place of the filters 13, used for spectrum spreading control in the prior art, the QPSK modulator of FIG. 5 amplitude modulates the I and Q channels by an overlapped raised cosine waveform produced by the overlapped raised cosine generator 20, in amplitude modulator 34.

Figure 6:
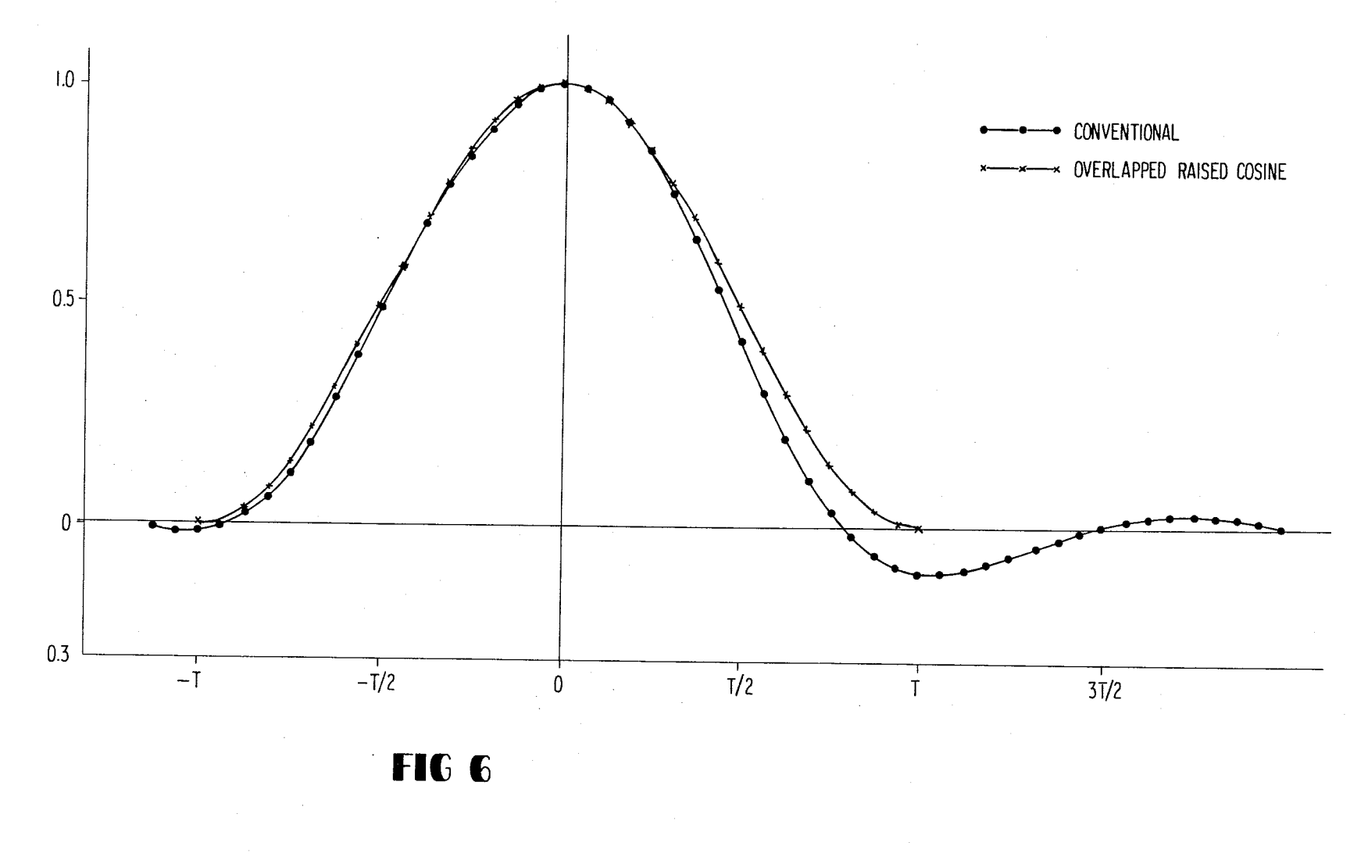
FIG. 6 is a pulse waveform illustrating conventional and overlapped raised cosine waveforms.

By so operating on the digital pulse train which comprises the I or Q channels, a single bit pulse, which is input to the modulator in squarewave form, will achieve a shape characteristic of the overlapped raised cosine; that shape is illustrated in FIG. 6. For comparison purposes, a typical prior art filter, for example a Butterworth (four pole) filter, when subjected to a squarewave input, will produce the shape which is also shown in FIG. 6, for comparison purposes. The remaining portions of the QPSK modulator of FIG. 5 are identical to the typical prior art modulator of FIG. 1, for example.

As a result of the amplitude modulation, in modulator 34, the input to modulator 14 is $$e_I(t) = \sum_{k=-\infty}^{k=\infty} a_k S(t - KT) \text{ and } e_q(t) = \sum_{k=-\infty}^{k=\infty} b_k S(t - KT)$$

where $a_k$ and $b_k$ are random variables reflecting the modulation i.e., $\pm 1$ independently; T is the symbol period of the QPSK signal; and S(t) is the pulse waveform which is to be optimized from the adjacent channel interference point of view. The resulting output signal of modulators 14 can be expressed as:

$$e_I(t) = [\sum_{k=-\infty}^{k=\infty} A\, a_k S(t - KT)] \sin(w_o t + \theta)$$

-continued $$e_Q(t) = [\sum_{k=-\infty}^{k=\infty} A\, b_k S(t - KT)] \cos(w_o t + \theta)$$

where $w_o$ is the angular frequency of the intermediate frequency (for example, $w_o/2\pi$ is typically 70 MHz); $\theta$ is the constant phase of the carrier. The summation of the I and Q channel IF signals then pass through the HPA. For the overlapped raised cosine waveform $$S(t) = \cos^2\left(\frac{\pi}{2T}\right)t \quad |t| \leq T$$
$$= 0 \quad |t| > T$$

Figure 7A:
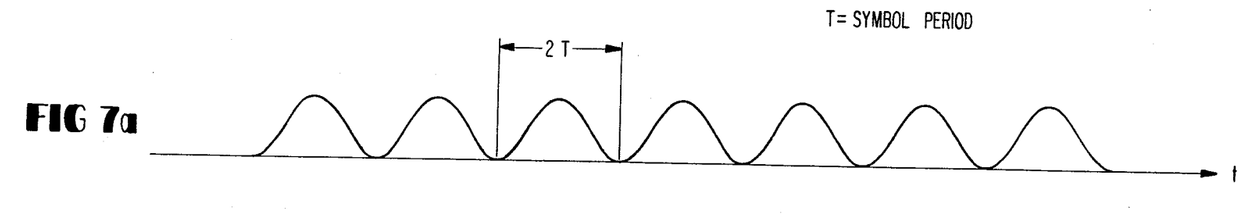
FIGS. 7A and 7B illustrate the synthesis of the overlapped raised cosine waveform.
Figure 7B:
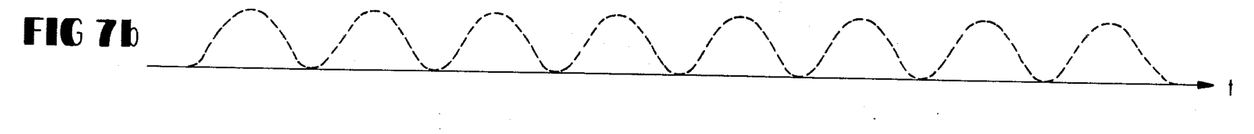

The overlapped raised cosine waveform is particularly simple to synthesize, in fact, it can be derived from the waveforms shown in FIGS. 7A and 7B.

For purposes of comparison, with prior art PSK modulators in the environment referred to hereinbefore, we can assume that the HPA is operating at the saturating level, transponder frequency separation is 49 MHz. and transponder usable bandwidth is 43 MHz. We further assume that the transponder input filter (F2) is an 8-pole Elliptic (2 poles for equalization) and the output filter (F3) is a 6-pole Elliptic filter. We also assume that the modem receiving filter (F4) is a 4-pole Butterworth with BT=1.1. For comparison purposes, we will assume a PSK modulator bandpass filter comprising a four-pole Butterworth filter with BT=1.5.

The assumed prior art system, outlined above, provides a ratio of carrier power to adjacent channel interference of about 22 dB at the demodulator output (for 48 megabit transmission rate). This is inadequate, especially in the context of TDMA, especially when the desired channel may be subjected to up-link attenuation as a result of rain. This up-link rain attenuation may amount to 8 dB, and under these circumstances, the conventional PSK modulator would have inadequate signal to noise ratio to maintain desired bit error rate.

For purposes of comparison, FIG. 8 illustrates the relative power spectrum as a function of normalized frequency for the prior art PSK modulator (employing, for example, 4-pole Butterworth filter) as compared to the PSK modulator employing the overlapped raised cosine waveform. It will be noted that in the region within about 22 MHz. from the center of the reference channel, the power spectra of the two signals are very close, that in the region between 22 MHz. and 40 MHz. from channel center, the overlapped raised cosine waveform produces a lower out of band energy then does the conventional waveform, as is the case above about 48 MHz. from channel center frequency.

Figure 9:
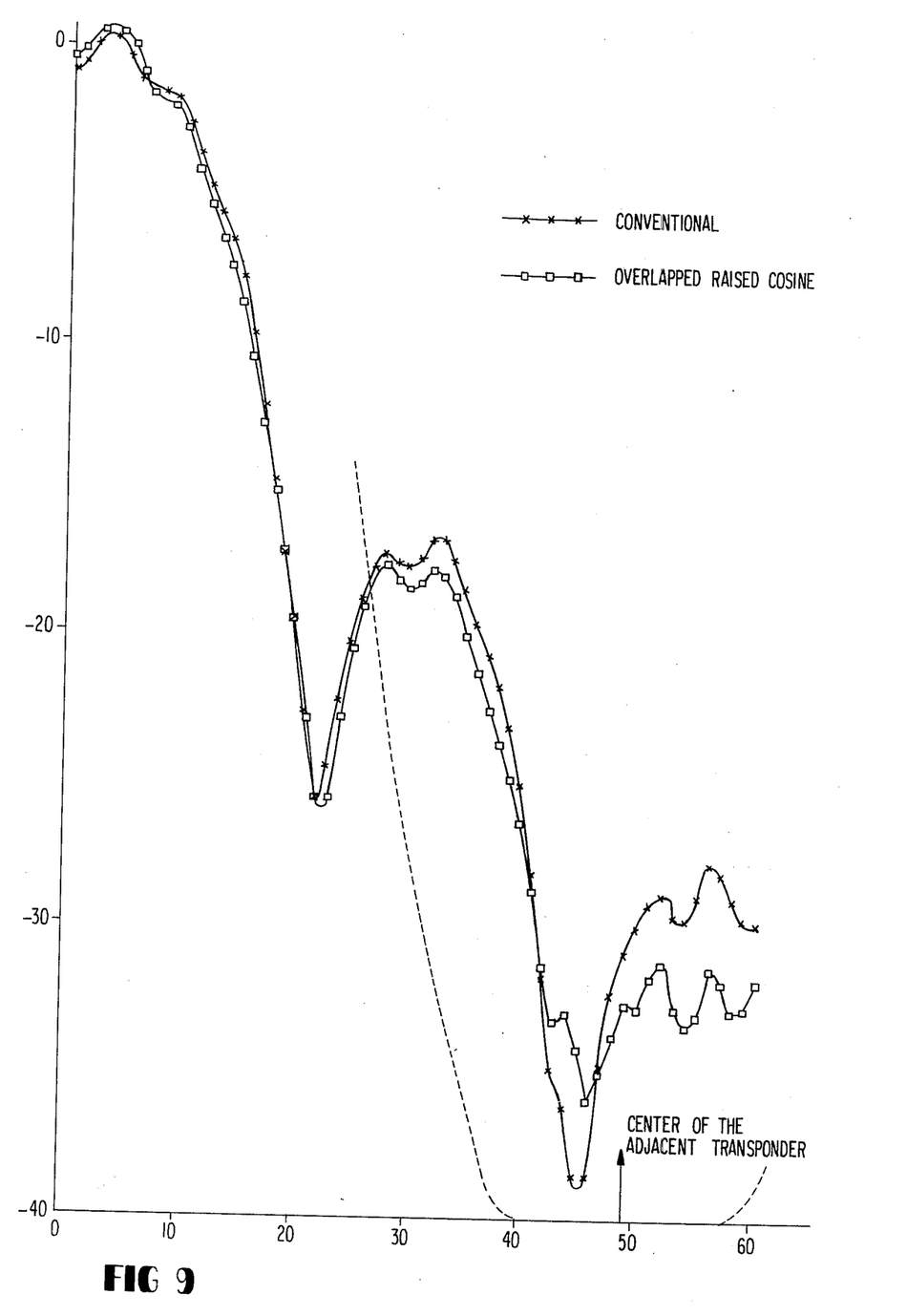
FIGS. 9 and 10 are alternative inventive PSK modulators.
Figure 10:
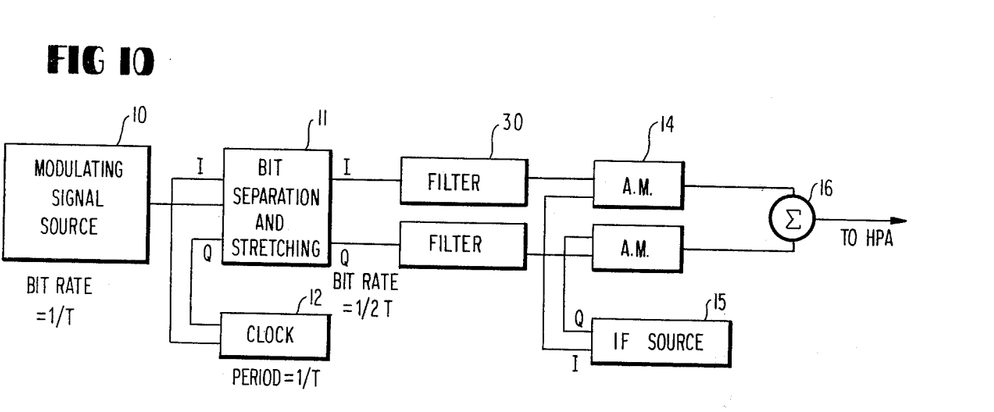

Use of the overlapped raised cosine waveform, however, does not require a modulator such as is shown in FIG. 5. Rather, a filter can be constructed whose response to a squarewave input is either an overlapped raised cosine waveform or a waveform of the overlapped raised cosine type. FIGS. 9 and 10 illustrate, respectively, alternative embodiments of the PSK modulator, particularly a QPSK modulator in which the overlapped raised cosine generator 20 has been eliminated. In its stead, FIG. 9 employs filters 30. Filter 30 is constructed so that its response to a squarewave is a waveform of the overlapped raised cosine type.

As a still further alternative, the filters 30, in the I and Q channels, are eliminated, and the I and Q channels are fed directly to the amplitude modulator 14, as shown in FIG. 10. In this embodiment, a bandpass filter 35 is coupled between the summing device 16 and the HPA. The bandpass filter 35 is constructed so that the envelope of the output signal will be a waveform of the overlapped raised cosine type when subjected to a modulated squarewave form input.

Figure 11:
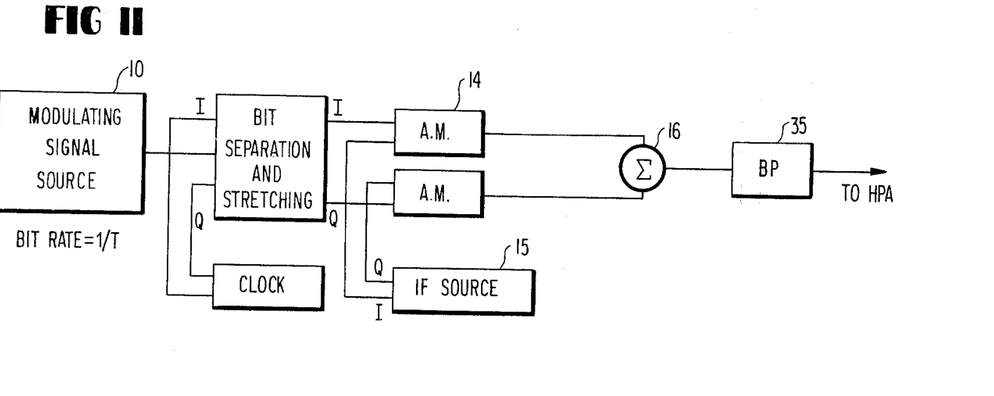
FIG. 11 is a pulse waveform comparing conventional, overlapped raised cosine and Thomson filter (BT=1.2) pulse response.

We have found that a fourth order Thomson filter, with single attenuation pole, can provide the desired response, and can be configured as either a low pass filter 30 or a bandpass filter 35. FIG. 11 compares the squarewave response of such a Thomas filter (with BT equal to 1.2) waveform produced by the above specified conventional system and overlapped raised cosine waveform. Inspection of FIG. 11 reveals that this particular Thomson filter produces a waveform which is almost identical to the overlapped raised cosine waveform.

Figure 12:
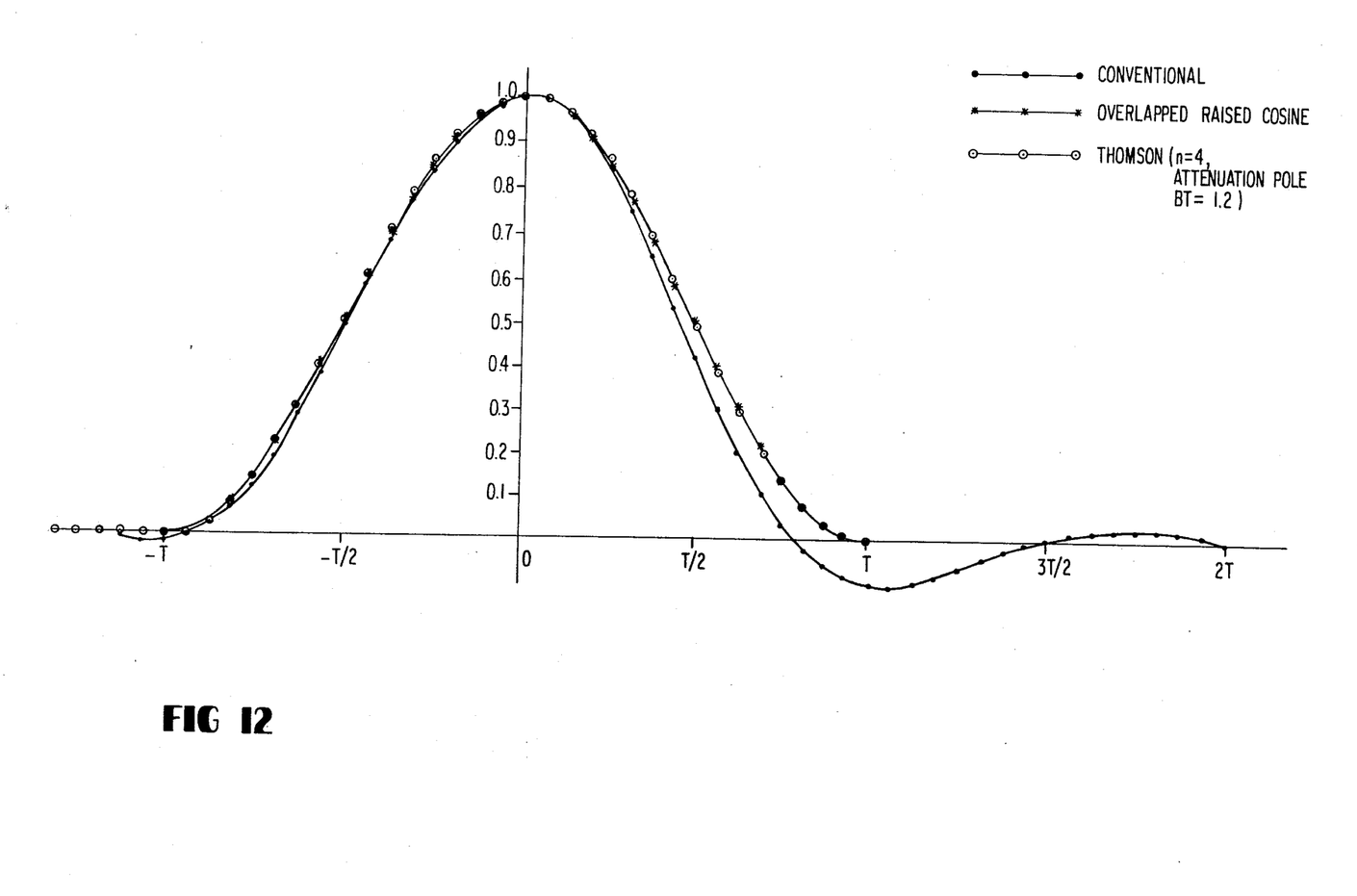
FIG. 12 compares overlapped raised cosine waveform with pulse response of Thomson filter (BT=1.0)
Figure 13:
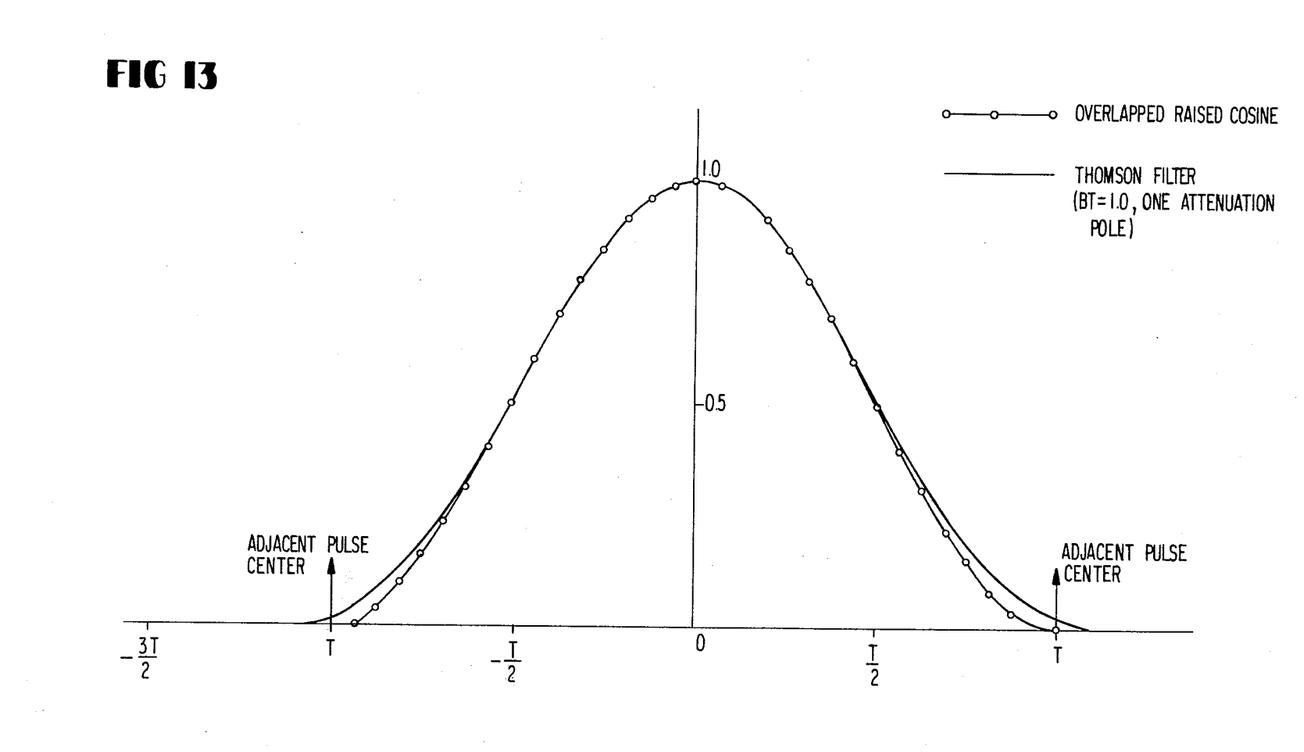
FIG. 13 compares power spectra of conventional, overlapped raised cosine and Thomson filter (BT=1.0) modulators at the HPA output.

While this filter will therefore give improved adjacent channel interference performance in a QPSK modulator, we have further found that varying the Thomson filter parameters produces waveforms of the overlapped raised cosine type, i.e., slightly different from the overlapped raised cosine waveform. More particularly, varying Thomson filter parameters to provide BT products in the range 0.9 to 1.2 appears to maintain the spectrum spreading control at least as well as filters with BT=1.2. The fourth order Thomson filter with single attenuation pole and BT product of 1.0 appears to be optimum from the spectrum spreading control viewpoint and consequent reduction in adjacent channel interference. FIG. 12 compares the overlapped raised cosine waveform with the pulse response produced by the Thomson filter (BT=1.0) and FIG. 13 illustrates the relative power spectra at the output of the HPA for the conventional, overlapped raised cosine waveform and Thomson filter (BT=1.0). FIG. 13 illustrates the advantages of the Thomson filter (BT=1.0) even over the overlapped raised cosine waveform with respect to adjacent channel interference performance.

Figure 14:
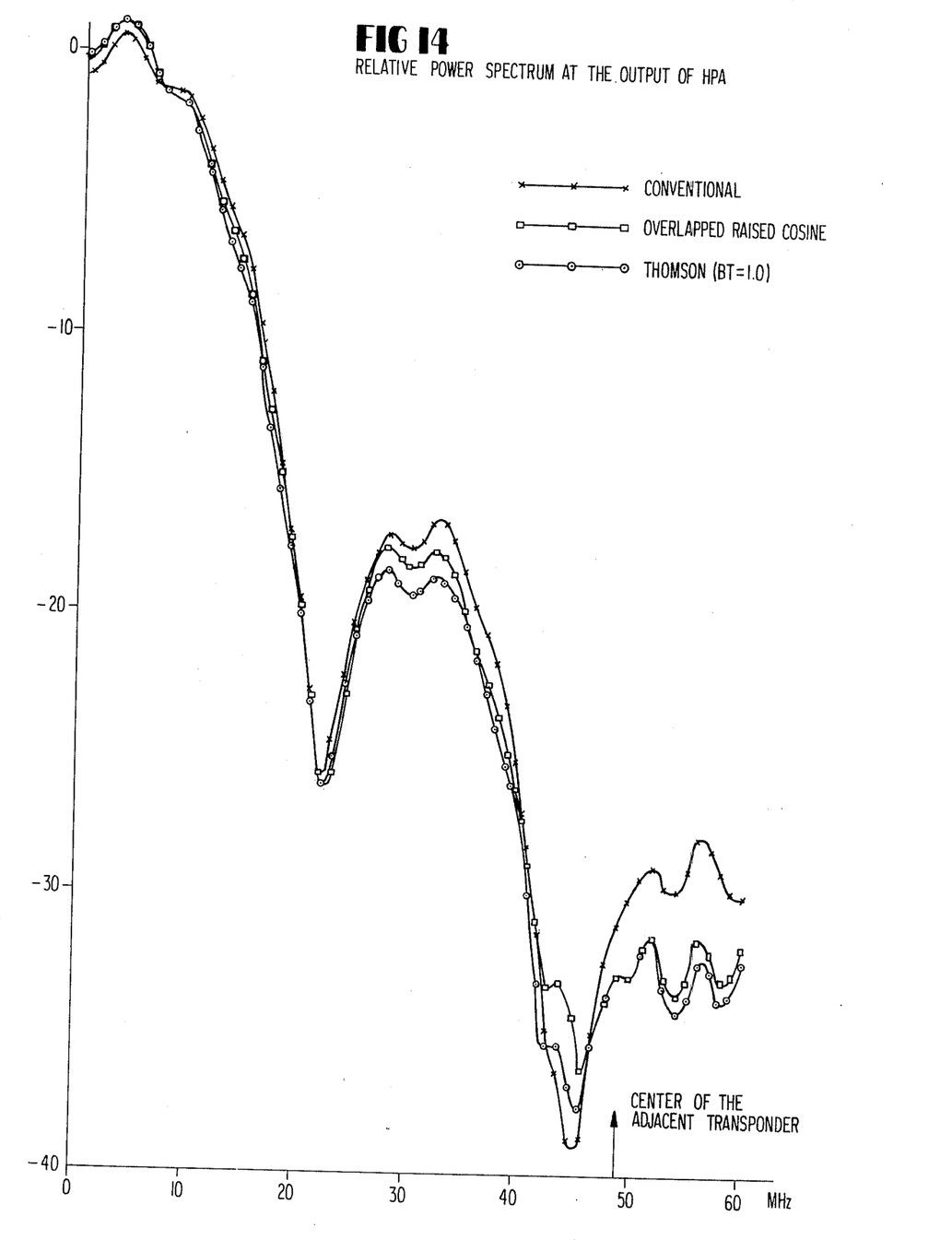
FIG. 14A and 14B are, respectively, constant voltage and constant current schematics for the preferred Thomson low pass filter (BT=1.0).
Figure 15A:
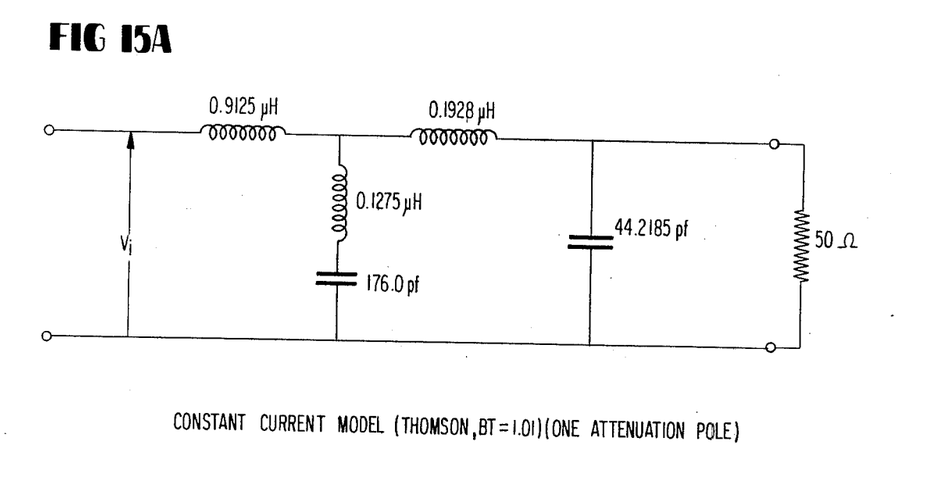
Figure 15B:
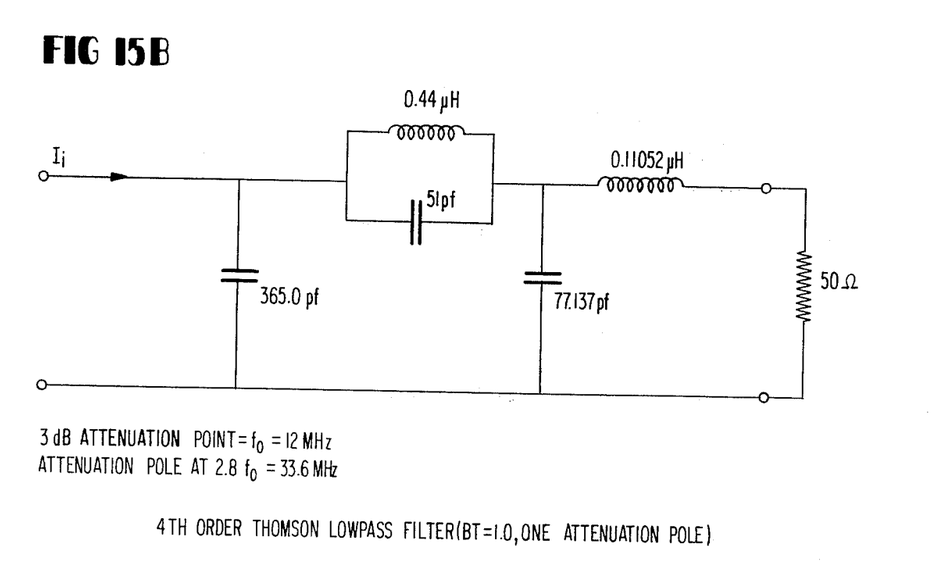

Finally, FIGS. 14A and 14B illustrate exemplary schematic circuits for the fourth order Thomson filter (single attenuation pole with BT=1.0 comprising constant voltage and constant current filters). While the schematics of FIGS. 14A and 14B are suitable for use as low pass filters 30, those of ordinary skill in the art can readily produce a schematic for a bandpass filter 35 from the specificiation of the filter itself, i.e., fourth order, single attenuation pole, BT=1.0 and the specification of the channel center frequency, and accordingly, a specific disclosure of such schematic is not included herein.

What is claimed is:

1. A PSK transmitter for reducing adjacent channel interference, particularly useful in power limited applications including a high powered amplifier operating in a non-linear amplifying region, comprising:
    PSK modulator means responsive to a modulation signal input for producing a PSK modulated signal,
    said high powered amplifier coupled to said PSK modulated signal for increasing said signal's level, wherein the improvement comprises:
    overlapped raised cosine generating means, in said PSK modulator means for producing said PSK modulated signal with a waveform of the overlapped raised cosine type.

2. The apparatus of claim 1 wherein said overlapped raised cosine generating means comprises a filter coupled between a modulation signal input and said high powered amplifier said filter having a square wave response of the overlapped raised cosine type.

3. The apparatus of claim 2 wherein said filter comprises a lowpass filter.

4. The apparatus of claim 2 wherein said filter comprises a bandpass filter.

5. The apparatus of claim 2 wherein said PSK transmitter is a QPSK transmitter.

6. The apparatus of claim 5 wherein said filter comprises a lowpass filter.

7. The apparatus of claim 5 wherein said filter comprises a bandpass filter.

8. The apparatus of claim 6 wherein said filter comprises a fourth order Thomson filter with single attenuation pole.

9. The apparatus of claim 8 wherein said Thomson filter has a time bandwidth product in the range 0.9 to 1.2.

10. The apparatus of claim 9 wherein said Thomson filter has a time bandwidth product of 1.2.

11. The apparatus of claim 9 wherein said Thomson filter has a time bandwidth product of 1.0.

12. The apparatus of claim 7 wherein said filter comprises a fourth order Thomson filter with single attenuation pole.

13. The apparatus of claim 12 wherein said filter has a time bandwidth product in the range 0.9 to 1.2.

14. The apparatus of claim 13 wherein said filter has a time bandwidth product of 1.2.

15. The apparatus of claim 13 wherein said filter has a time bandwidth product of 1.0.

16. A QPSK modulator capable of reducing spectrum spreading when employed with a high powered amplifier operating in a non-linear region comprising:
    a source of a pair of phase-displaced i-f signals,
    amplitude modulation means responsive to said pair of i-f signals and responsive to further I and Q signals for producing a pair of amplitude modulated waveforms,
    means for summing said waveforms for coupling to a high powered amplifier, and
    means responsive to a pair of modulation signal inputs for producing said further I and Q signals with waveforms of the overlapped raised cosine type.

17. The apparatus of claim 16 wherein said means responsive to a pair of modulation signal inputs comprises a pair of lowpass fourth order Thomson filters, each with single attenuation pole and time bandwidth product in the range 0.9 to 1.2.

18. The apparatus of claim 17 wherein each of said filters has a time bandwidth product of 1.2.

19. The apparatus of claim 7 wherein each of said filters has a time bandwidth product of 1.0.

20. A QPSK modulator capable of producing reduced spectrum spreading when used with a high powered amplifier operating in a non-linear region comprising:
    a source of a pair of phase displaced i-f signals,
    amplitude moduation means responsive to said i-f signals, and to responsive to further I and Q signals for producing a pair of amplitude modulated waveforms,
    means for summing said pair of amplitude modulated waveforms, and
    bandpass filter means coupled to said summing means and adapted to be coupled to a high powered amplifier, said bandpass filter means providing an output envelope in response to squarewave amplitude modulated i-f signals, of the overlapped raised cosine type.

21. The apparatus of claim 20 wherein said bandpass filter means comprises a fourth order Thomson filter with single attenuation pole and time bandwidth product in the range 0.9 to 1.2.

22. The apparatus of claim 21 wherein said Thomson filter has a time bandwidth product of 1.2.

23. The apparatus of claim 21 wherein said Thomson filter has a time bandwidth product of 1.0.

* * * * *